(12) United States Patent  
Kargl et al.

(10) Patent No.: US 9,135,546 B2  
(45) Date of Patent: Sep. 15, 2015

(54) SMART CARD

(71) Applicant: Infineon Technologies AG, Neubiberg (DE)

(72) Inventors: Walter Kargl, Graz (AT); Richard Sbuell, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/285,669

(22) Filed: May 23, 2014

(65) Prior Publication Data

US 2014/0346236 A1  Nov. 27, 2014

(30) Foreign Application Priority Data

May 23, 2013  (DE) .......................... 10 2013 105 291

(51) Int. Cl.  
*G06K 19/06* (2006.01)  
*G06K 19/07* (2006.01)

(52) U.S. Cl.  
CPC ........ *G06K 19/0708* (2013.01); *G06K 19/0723* (2013.01)

(58) Field of Classification Search  
USPC .................. 235/492, 380, 487, 488, 451, 375  
See application file for complete search history.

(56) References Cited

U.S. PATENT DOCUMENTS

| | | | | |
|---|---|---|---|---|
| 5,469,399 A * | 11/1995 | Sato et al. | ...................... | 365/226 |
| 2005/0179549 A1* | 8/2005 | Ota | ........................... | 340/572.1 |
| 2005/0237039 A1 | 10/2005 | Kikuchi et al. | | |
| 2006/0124897 A1* | 6/2006 | Shingai et al. | ........... | 252/299.01 |
| 2007/0241183 A1* | 10/2007 | Brown et al. | ................. | 235/380 |
| 2010/0072277 A1* | 3/2010 | Kim | ............................ | 235/439 |
| 2010/0072284 A1* | 3/2010 | Nishizawa et al. | ........... | 235/492 |
| 2011/0147461 A1* | 6/2011 | Chen | ............................. | 235/488 |
| 2011/0187435 A1 | 8/2011 | Kamata | | |
| 2015/0042170 A1* | 2/2015 | Makita | .......................... | 307/104 |

OTHER PUBLICATIONS

Office action dated Feb. 4, 2014 received for the parallel German application 10 2013 105 291.6.

* cited by examiner

*Primary Examiner* — Edwyn Labaze

(57) ABSTRACT

In accordance with various embodiments, a smart card is described which has an antenna, which is configured to receive an electromagnetic signal, a rectifier, which is configured to rectify the received signal, and a capacitive or an inductive DC-to-DC voltage converter, which is configured to provide a supply voltage on the basis of the rectified signal.

11 Claims, 6 Drawing Sheets

SMART CARD

CROSS-REFERENCE TO RELATED APPLICATION

This application claims priority to German Patent Application Serial No. 10 2013 105 291.6, which was filed May 23, 2013, and is incorporated herein by reference in its entirety.

TECHNICAL FIELD

Various embodiments relate generally to smart cards.

BACKGROUND

Contactless smart cards are typically supplied energy by the electromagnetic field of a smart card reader. Since the energy received in this way by a smart card by means of its antenna is limited, it is desirable to pass on the received energy from the antenna with as few losses as possible to the components of the smart card which are intended to be supplied.

SUMMARY

In accordance with various embodiments, a smart card is provided which has an antenna, which is configured to receive an electromagnetic signal, a rectifier, which is configured to rectify the received signal, and a capacitive or an inductive DC-to-DC voltage converter which is configured to provide a supply voltage on the basis of the rectified signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The detailed description below relates to the attached figures, which show details and exemplary embodiments. Other embodiments are also possible, and the exemplary embodiments can be modified in terms of structural, logic and electrical considerations without departing from the subject matter of the invention. The various embodiments are not necessarily mutually exclusive, but rather it is possible for various embodiments to be combined with one another so as form new embodiments.

In accordance with the standard ISO 14443, the most basic implementation of a contactless RFID system has a reader (PCD: proximity coupling device) and a smart card (PICC: proximity integrated circuit card). Bidirectional data communication between the reader and the smart card and also energy transfer between the reader and the smart card is achieved by means of two inductively coupled antennas. The magnetic field which is transmitted by the antenna of the reader is in this case received by the antenna of the smart card, which therefore provides a certain power at its connections, which power can be used to supply energy to the components of the smart card.

Figure 1:
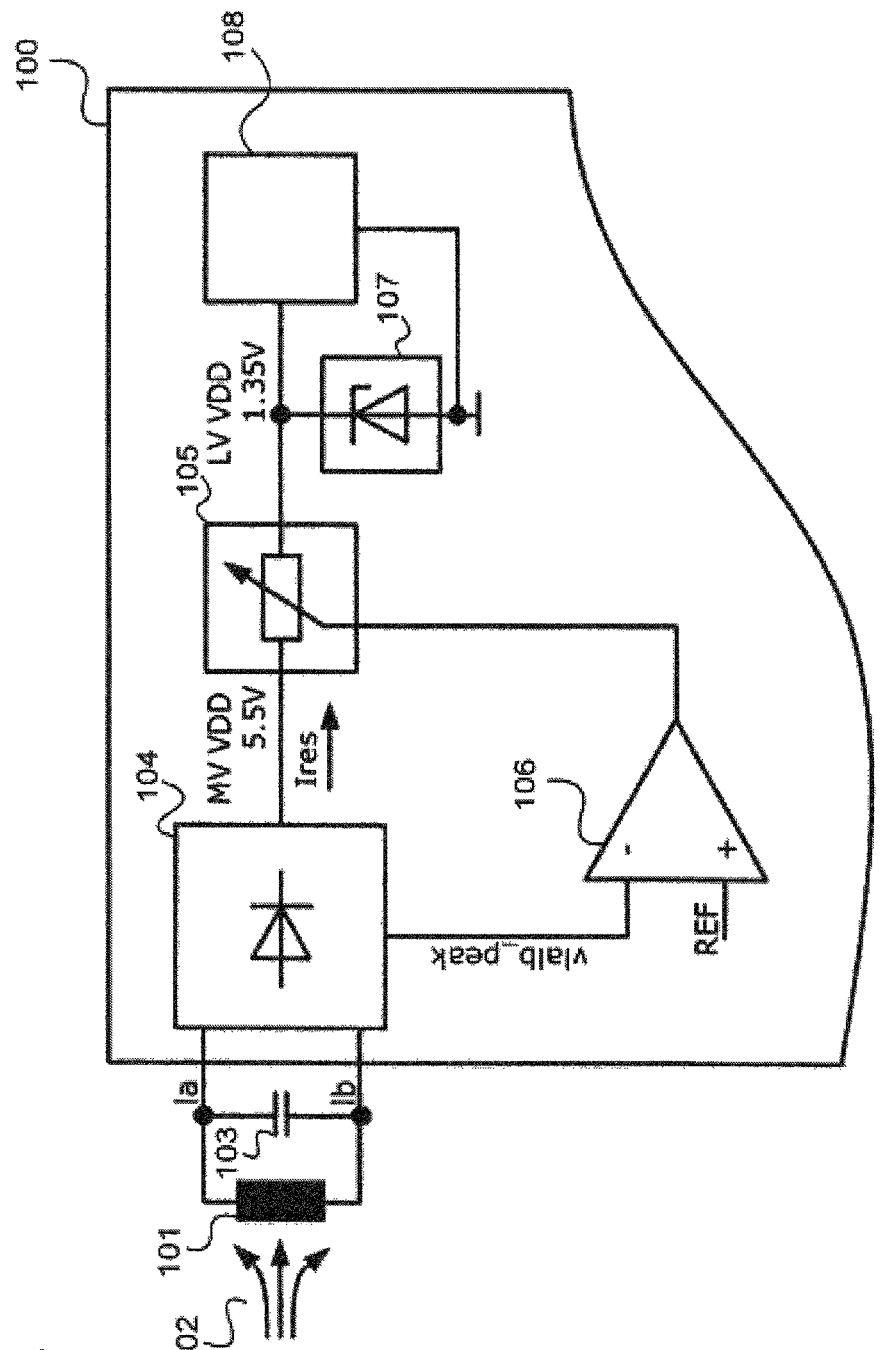
FIG. 1 shows a smart card with a supply path which contains a variable resistor.

An example of the energy supply path of a smart card is illustrated in FIG. 1.

FIG. 1 shows a smart card 100.

The smart card 100 has an antenna 101, which is configured to receive an electromagnetic signal from a field 102. A tuning capacitance 103 arranged in parallel with the antenna forms a parallel tuned circuit (resonant circuit) with the antenna 101 and the further smart card components coupled thereto.

The connections of the antenna 101 are coupled to the inputs of a rectifier 104, which provides a rectified signal with a maximum voltage or amplitude MV VDD, in this example 5.5 V. The rectified signal is supplied to a variable resistor 105. The variable resistor 105 is controlled by the output signal of an operational amplifier 106 (generally an antenna voltage regulator), which compares the present maximum antenna voltage (peak antenna voltage) with a reference voltage. A Zener diode 107 (generally a shunt) and one or more components 108 to be supplied (for example an integrated logic circuit) are connected to the output of the variable resistor 105.

The antenna receives a sinusoidal electromagnetic signal (for example from a smart card reader) from the field 102. The strength of the field 102 can be represented by the rms field strength $H_{field}$. A sinusoidal current is induced in the antenna and, correspondingly, a certain power is supplied to the parallel tuned circuit. The tuning capacitance 103 is connected in parallel with the further smart card components 104, 105, 106, 107, 108.

By means of setting the variable resistor 105, the Q factor of the parallel tuned circuit is set such that the maximum value (peak value) of the antenna voltage is equal to a certain target value (namely the reference voltage) by virtue of the current consumption and ultimately the input impedance of the rectifier or of the arrangement including the smart card components 104, 105, 106, 107, 108 being changed.

The antenna voltage is first supplied to the rectifier 104 which generates a signal vlalb_peak from this which is proportional to the maximum value of the antenna voltage. The operation amplifier 106 compares this signal with a reference signal REF, which characterizes the reference voltage, and correspondingly controls the variable resistor. If the maximum value of the antenna voltage is greater than the reference voltage, the value of the variable resistor 105 is reduced and vice versa. Therefore, the current $I_{res}$ which is flowing into the variable resistor 105 is changed continuously by means of the control loop and is dependent on the field strength of the field 102 at the antenna 101. The current which is available at the output of the variable resistor 105 is consumed by the component 108 to be supplied and the Zener diode 107. If the current consumption of the component 108 to be supplied is lower than the current available at the output of the variable resistor 105, the difference is consumed by the Zener diode 107 (i.e. flows away to the connection to ground via the Zener diode 107).

The voltage at the output of the rectifier MV_VDD (for example 5.5 V) is typically higher than the voltage at the output of the variable resistor LV_VDD (for example 1.35 V). Correspondingly, the power loss at the variable resistor is equal to (MV_VDD−LV_VDD)*$I_{res}$. The efficiency of this structure is therefore provided by $P_{MV}/P_{LV}$=LV_VDD/MV_VDD where $P_{MV}$ is the power at the output of the rectifier 104, and $P_{LV}$ is the power at the output of the variable resistor 105. This efficiency is typically (considerably) lower than 1 (for example 0.23) since LV_VDD is lower than MV_VDD.

The text which follows describes a smart card which enables, for example, efficient transfer of the power drawn at the smart card antenna to a component to be supplied.

Figure 2:
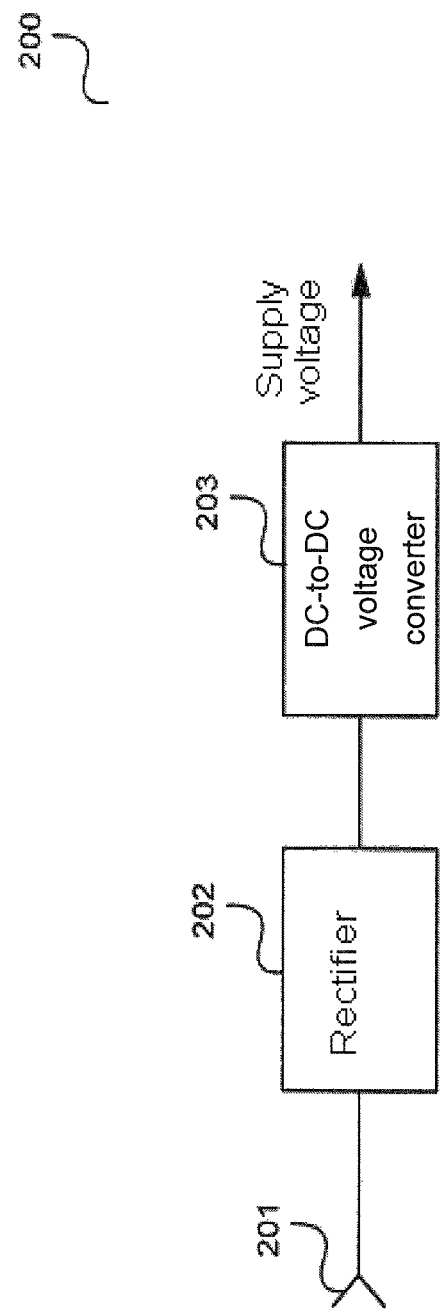
FIG. 2 shows a smart card with a supply path which contains a DC-to-DC voltage converter.

FIG. 2 shows a smart card 200.

The smart card 200 has an antenna 201, which is configured to receive an electromagnetic signal, and a rectifier 202 which is configured to rectify the received signal. In addition, the smart card 200 has a capacitive or an inductive DC-to-DC voltage converter 203, which is configured to provide a supply voltage on the basis of the rectified signal.

In other words, a DC-to-DC converter is introduced into the supply path (for example instead of a linear component such as the variable resistor 105). In this way, the energy drawn at the antenna can be passed on more efficiently since the DC-to-DC converter can pass on the energy or power efficiently.

The DC-to-DC voltage converter is configured, for example, to provide the supply voltage for a component to be supplied.

For example, the DC-to-DC voltage converter is configured to provide the supply voltage for an integrated circuit.

In accordance with one embodiment, the DC-to-DC voltage converter is a switched inductive DC-to-DC voltage converter or a switched capacitive DC-to-DC voltage converter.

In accordance with various embodiments, the smart card has a stabilization circuit, which is configured to limit the supply voltage to a predetermined value.

The stabilization circuit has, for example, a Zener diode (connected to ground, for example).

The rectified signal is, for example, a pulse signal.

In accordance with one embodiment, the smart card has a regulating circuit, which is configured to regulate the maximum antenna voltage.

The regulating circuit can be configured, for example, to regulate the maximum antenna voltage by setting the input resistance of the rectifier.

For example, the rectified signal is a pulse signal and the regulating circuit is configured to set the input resistance by setting the pulse width of the pulse signal.

The regulating circuit is configured, for example, to regulate the maximum antenna voltage to a predetermined reference voltage.

A supply circuit for a smart card which is based on a rectifier structure (AC/DC converter structure) is described by way of example below.

Figure 3:
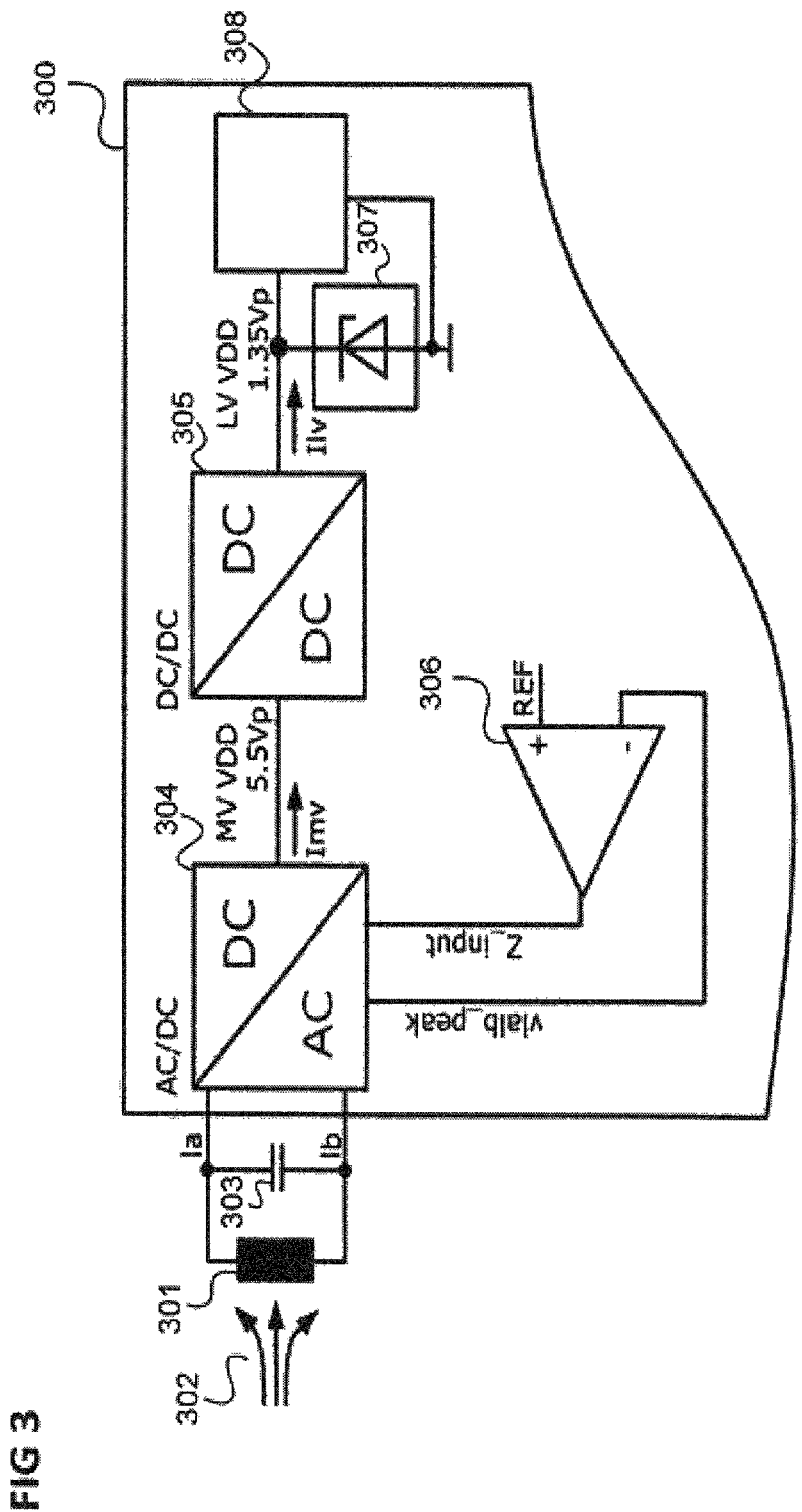
FIG. 3 shows a further example of a smart card which is based on a rectifier structure.

FIG. 3 shows a smart card 300.

The smart card 300 has an antenna 301, which is configured to receive an electromagnetic signal from a field 302. A tuning capacitance 303 arranged in parallel with the antenna forms a parallel tuned circuit (resonant circuit) with the antenna 301 and the further smart card components coupled thereto.

The connections of the antenna 301 are coupled to the inputs of a rectifier 304, which provides a rectified signal with a maximum voltage or amplitude MV VDD in this example of 5.5 V.

The rectifier 304 is controlled by the output signal of an operational amplifier 306 (generally an antenna voltage regulator), which compares the present maximum antenna voltage (peak antenna voltage) with a reference voltage.

The rectified signal is supplied to a DC-to-DC voltage converter 305. A Zener diode 307 (generally a shunt) and one or more components 308 to be supplied (for example an integrated logic circuit) are connected to the output of the DC-to-DC voltage converter 305.

The antenna receives a sinusoidal electromagnetic signal (for example from a smart card reader) from the field 302. The strength of the field 302 can be represented by the rms field strength $H_{field}$. A sinusoidal current is induced in the antenna 301 and, correspondingly, a certain power is supplied to the parallel tuned circuit. The tuning capacitance 303 is connected in parallel with the further smart card components 304, 305, 306, 307, 308.

In this example, the supply path has the rectifier 304 and the DC-to-DC voltage converter 305. In this example, the rectifier 304 is implemented in such a way that the impedance at its AC input (denoted by Ia and Ib in FIG. 3) can be set in accordance with the output signal of the operational amplifier 106 denoted by Z_input.

By setting this input impedance of the rectifier 304, the Q factor of the parallel tuned circuit is set such that the maximum value (peak value) of the antenna voltage is equal to a certain target value (namely the reference voltage).

The antenna voltage is first supplied to the rectifier 304, which generates a signal vlalb_peak from this which is proportional to the maximum value of the antenna voltage. The operational amplifier 306 compares this signal with a reference signal REF, which characterizes the reference voltage and controls the rectifier 304 correspondingly. If the maximum value of the antenna voltage is greater than the reference voltage, the input impedance of the rectifier 304 and the Q factor of the resonant circuit is reduced by reducing the level of the signal Z_input and vice versa.

The current $I_{mv}$ which is available at the output of the rectifier 304 is supplied to the DC-to-DC voltage converter 305. The average value of the current $I_{mv}$ is the result of the available field strength of the electromagnetic field 302 at the antenna 301 and the set maximum antenna voltage. By implementing the DC-to-DC voltage converter 305 as an inductive DC-to-DC voltage converter, for example a switched inductive DC-to-DC voltage converter, or a capacitive DC-to-DC voltage converter, for example a switched capacitive DC-to-DC voltage converter, it is possible for its efficiency factor EFF=$P_{LV}/P_{MV}$ to be close to unity. In this case $P_{MV}$ is the power at the output of the rectifier 304, and $P_{LV}$ is the power at the output of the DC-to-DC voltage converter 305.

The current which is available at the output of the DC-to-DC voltage converter 305 is equal to $I_{lv}=I_{mv}*MV\_VDD/LV\_VDD*EFF$, where MV_VDD is the voltage at the output of the rectifier 304, and LV_VDD is the voltage at the output of the variable resistor.

The current $I_{lv}$ is consumed by the component 308 to be supplied and the Zener diode 307. If the current consumption of the component 108 to be supplied is less than the current available at the output of the DC-to-DC voltage converter 305, the difference is consumed by the Zener diode 107 (i.e. flows away to the connection to ground via the Zener diode 107).

In comparison with the supply path of the smart card 100, the current $I_{lv}$ which is available at the output of the DC-to-DC voltage converter 305 of the component 308 to be supplied can be increased by a factor of MV_VDD/LV_VDD*EFF. In the case where EFF=0.9, MV_VDD=0.5 and LV_VDD=1.35, this current is therefore 3.7 times greater than that which is available in the case of the smart card 100 of the component 108 to be supplied.

An implementation example will be described below in which a contactless smart card has a supply path with an inductive DC-to-DC voltage converter.

Figure 4:
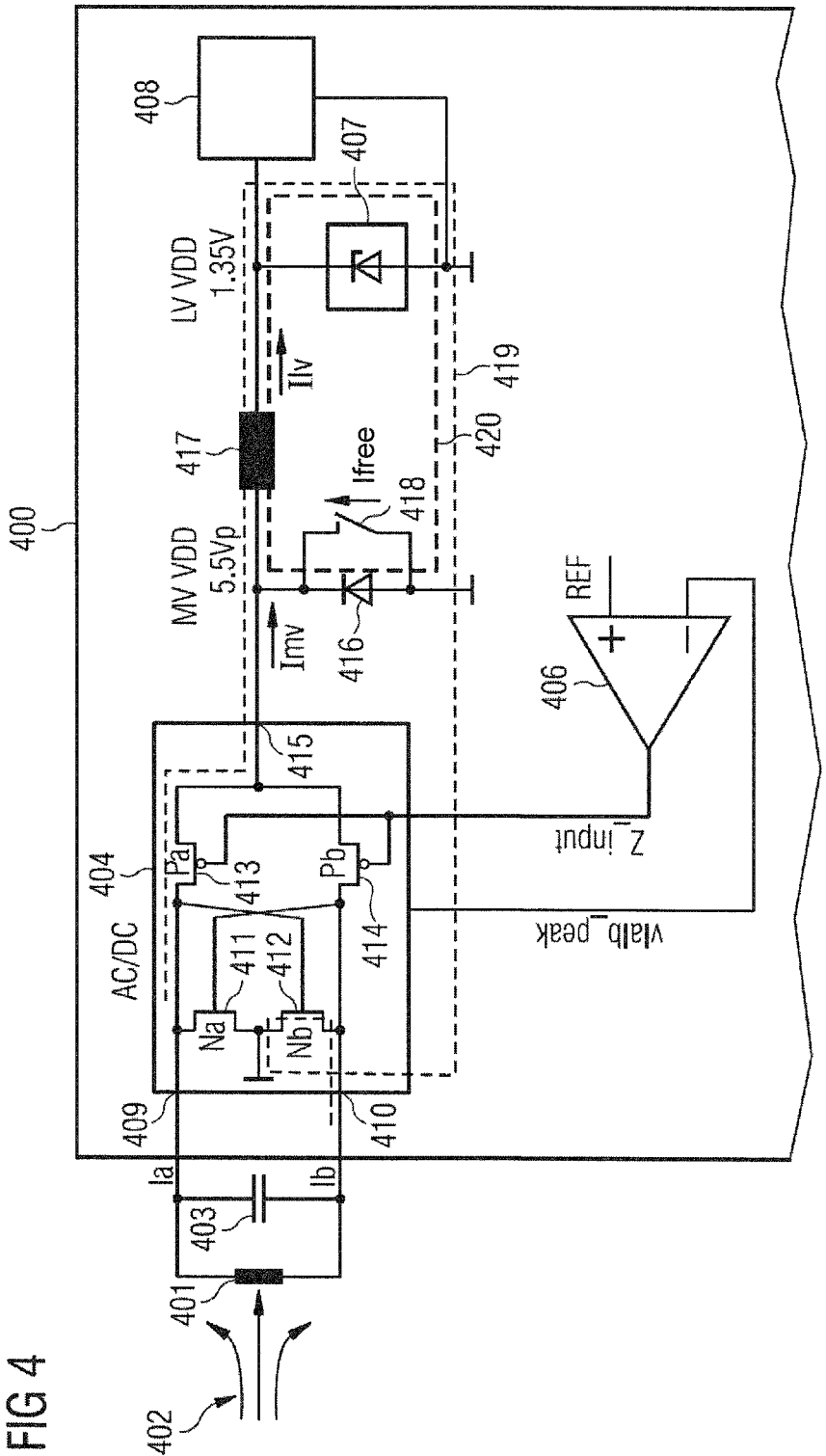
FIG. 4 shows a smart card with a supply path which contains a DC-to-DC voltage converter.

FIG. 4 shows a smart card 400.

Corresponding to FIG. 3, the smart card 400 has an antenna 401, which is configured to receive an electromagnetic signal from a field 402 and a tuning capacitance 403 arranged in parallel with the antenna forms a parallel tuned circuit (resonant circuit) with the antenna 401 and the further smart card components coupled thereto.

The connections of the antenna 401 are coupled to the inputs 409, 410 of a rectifier 404, which provides a rectified signal with a maximum voltage or amplitude MV VDD, in this example 5.5 V. In this example, the first input 409 of the rectifier 404 is coupled to the drain connection of a first nMOS transistor 411. The second input 410 is coupled to the drain connection of a second nMOS transistor 412. The source connections of the nMOS transistors 411, 412 are coupled to ground.

The gate connection of the first nMOS transistor 411 is coupled to the second input 410, and the gate connection of the second nMOS transistor 412 is coupled to the first input 409.

In addition, the first input 409 is coupled to the source connection of a first pMOS transistor 413, and the second input 410 is coupled to the source connection of a second pMOS transistor 414. The drain connections of the pMOS transistors 413, 414 are coupled to the output 415 of the rectifier 404.

The nMOS transistors 411, 412 implement (low-side) switches, which connect either the first input 409 or the second input 410 to ground (VSS). The pMOS transistors 413, 414 form (high-side) diodes, which connect either the first input 409 or the second input 410 to the output 415.

The antenna signal, characterized by the antenna voltage vIaIb, i.e. the voltage between the first input 409 and the second input 410, is sinusoidal. The potential at the first input 409 is denoted by $V_{Ia}$ below, and the potential at the second input 410 is denoted by $V_{Ib}$ below.

If $V_{Ia}>V_{Ib}+V_{THN}$, where $V_{THN}$ denotes the threshold voltage of the nMOS transistors 411, 412, the second input 410 is connected to ground by the second nMOS transistor 412. If $V_{Ib}>V_{Ia}+V_{THN}$, the first input 409 is connected to ground by the first nMOS transistor 411. $V_{Ia}$—VSS represents the positive half-cycle of the antenna signal, and $V_{Ib}$—VSS represents the absolute value of the negative half-cycle of the antenna signal.

The rectifier 404 is controlled by the output signal Z_input of an operational amplifier 406 (generally of an antenna voltage regulator), which compares the present maximum antenna voltage (peak antenna voltage) with a reference voltage.

If $V_{Ia}>Z\_input+V_{THP}$, the first input 409 is connected to the output 415 by means of the first pMOS transistor 413. If $V_{Ib}>Z\_input+V_{THP}$, the first input 409 is connected to the output 415 by means of the first pMOS transistor 413. $V_{THP}$ in this case denotes the threshold voltage of the pMOS transistors 413, 414.

The output signal Z_input of the operational amplifier 406 fixes the amount of charge which is transferred from the first input 409 or the second input 410 to the output 415 per half-cycle and ultimately the input impedance of the rectifier 404. On the basis of this, the operational amplifier 406 controls the maximum antenna voltage by matching the Q factor of the resonant circuit by means of the signal Z_input, as is described in connection with FIG. 3.

The rectified signal is supplied to a DC-to-DC voltage converter as in FIG. 3, which DC-to-DC voltage converter in this example has a freewheeling diode 416, whose anode is coupled to ground and whose cathode is coupled to the output 415, and has an inductance (coil) 417, which is coupled to the output 415. A switch 418 is connected in parallel with the freewheeling diode. The switch 418 is closed, for example, when the diode is not turned off, with the result that a power loss at the diode can be avoided.

A Zener diode 407 (generally a shunt) and one or more components 408 to be supplied (for example an integrated logic circuit) are connected to the output of the inductance. The Zener diode can also be considered to be part of the DC-to-DC voltage converter. Likewise, parts of the rectifier, for example the pMOS transistors 413, 414, can also be considered to be parts of the DC-to-DC voltage converter.

Figure 5:
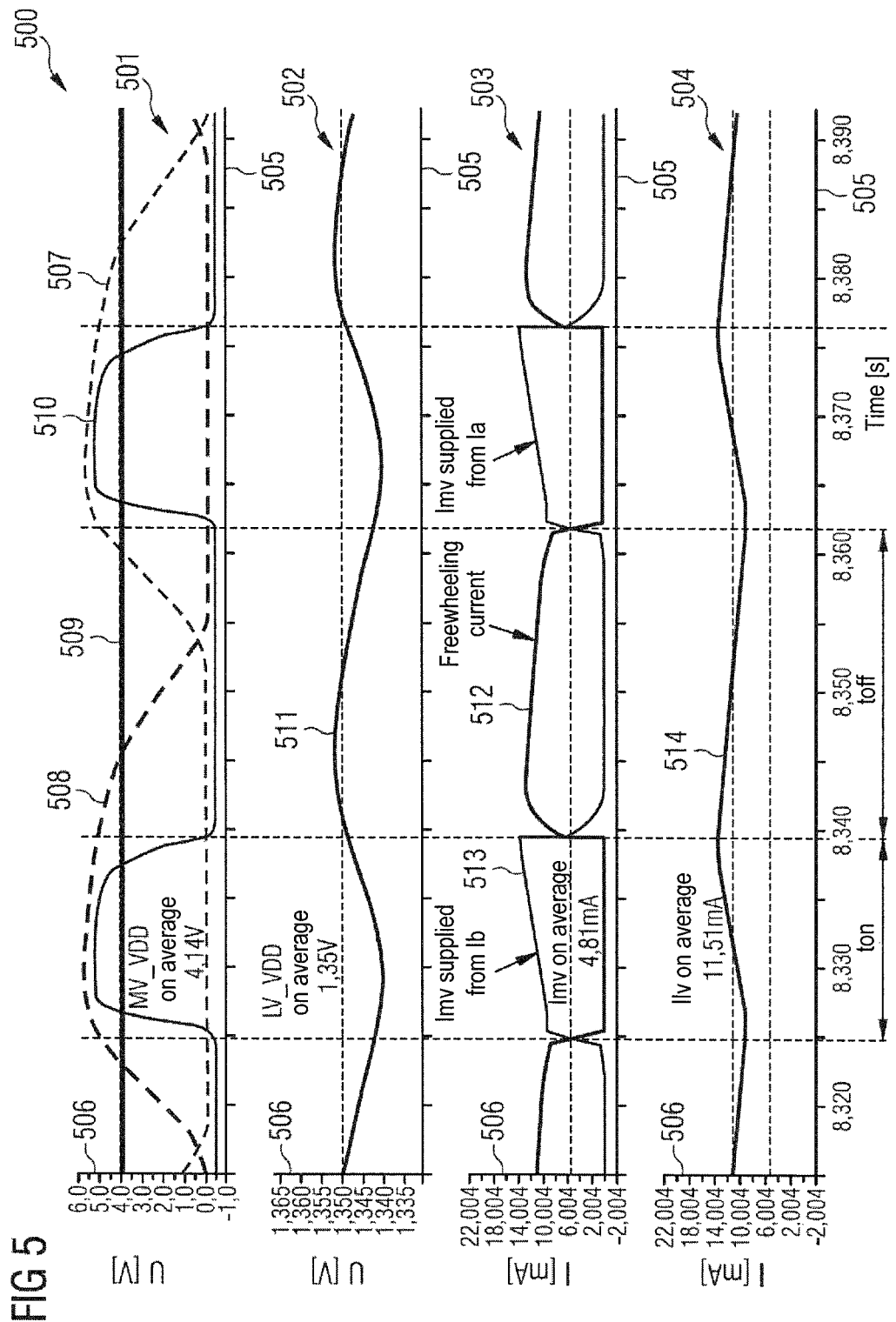
FIG. 5 shows voltage graphs and current graphs.

Examples of current and voltage profiles are illustrated in FIG. 5.

FIG. 5 shows voltage graphs 501, 502 and current graphs 503, 504.

The time profile goes from left to right along respective time axes 505 in the graphs 501, 502, 503, 504, and the voltage or the current increase from the bottom to the top along respective voltage axes or current axes 506.

The specified variables and current or voltage characteristics are based on a simulation at a radiofrequency of 13.56 MHz, a field strength of the field 402 of 1.5 A/m and a maximum antenna voltage of 11.6 V.

The first voltage graph 501 shows the potential at the first input 409 in a first graph 507, the potential at the second input 410 in a second graph 508, the (in this example constant) signal Z_input in a third graph 509 and the voltage at the output 415 in a fourth graph 510.

The second voltage graph 502 shows, in a fifth graph 511, the voltage at the output of the inductance 417.

The first current graph 503 shows the freewheeling current $I_{free}$ in a sixth graph 512 and the current $I_{mv}$ at the output 415 of the rectifier 404 in a seventh graph 513.

The second current graph 504 shows the current at the output of the inductance 417 in an eighth graph 514.

The pulsed current $I_{mv}$ at the output 415 corresponds to the charge transfer by the pMOS transistors 413, 414. FIG. 4 illustrates a first current path 419 illustrated by dashed lines for the current flow in the case of a current pulse of the current $I_{mv}$ in the positive half-cycle.

The duration of the interval for which a current pulse is delivered from the first input 409 by the first pMOS 413 (positive half-cycle) or from the second input 410 by the second pMOS 414 (negative half-cycle) is denoted by $t_{on}$ in FIG. 5.

A current pulse is supplied directly to the inductance 417 (in this case $I_{mv}=I_{lv}$). Correspondingly, the current $I_{lv}$ through the inductance 417 is increased during a current pulse and therefore the energy stored in the inductance 417 is also increased.

The duration of the interval for which no current pulses are provided by the rectifier 404 (since the pMOS transistors 413, 414 are switched off), is denoted by $t_{off}$ in FIG. 5. In this case, $I_{mv}$ is equal to zero (since no current pulse is available), and the current through the inductance 417 is equal to the free-wheeling current $I_{free}$ (i.e. $I_{lv}=I_{free}$).

FIG. 4 illustrates a second current path 420 shown by dashed lines for the current flow in this case, in which current is flowing through the freewheeling circuit (i.e. through the freewheeling diode 416 or the switch 418, which can in this case be closed correspondingly). The inductance 417 in this case acts as a current source, which supplies the current $I_{lv}$ to the component 408 to be supplied and the shunt 407. During the course of such a time interval in which the inductance 417 acts as current source in this way, the current $I_{lv}$ and the energy stored in the inductance 417 are reduced correspondingly.

The relationship between the current $I_{mv}$ and the current $I_{lv}$ is provided by MV_VDD/LV_VDD*EFF where the factor EFF is the efficiency of the DC-to-DC voltage converter and therefore is typically less than unity.

In the example illustrated in FIG. 5, the voltage MV_VDD is on average 4.14 V, the voltage LV_VDD is on average 1.35 V, the current $I_{mv}$ is on average 4.81 mA, and the current $I_{lv}$ is on average 11.51 mA.

Therefore, the ratio between $I_{lv}$ and $I_{mv}$ is equal to 11.51 mA/4.81 mA=2.39.

The efficiency of the circuit results from the above values (owing to $I^2R$ losses which have been added during the simulation) as EFF=(11.51mA/4.81mA)/(4.14V/1.35V)=0.78.

Figure 6:
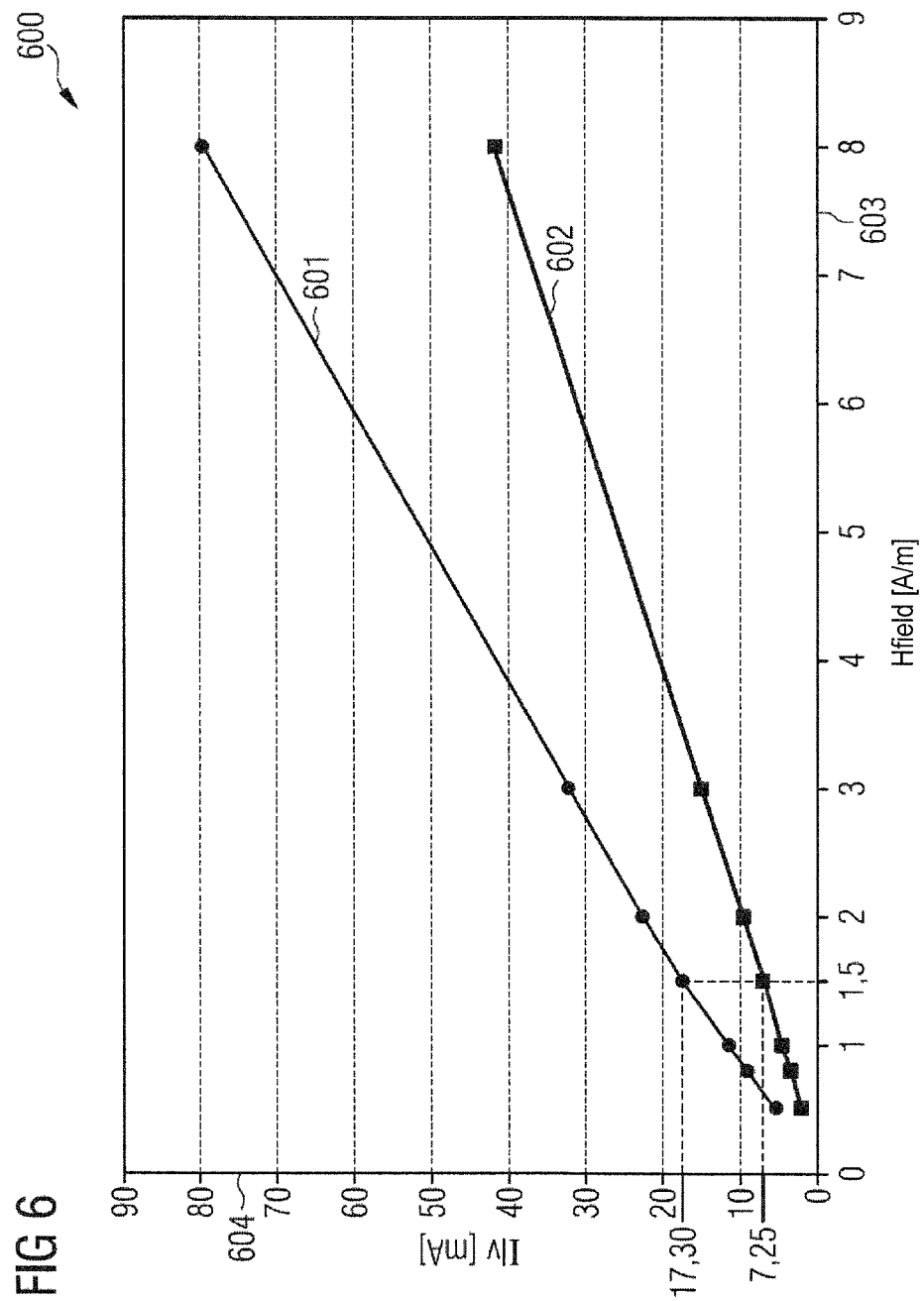
FIG. 6 shows a comparison of the supply current for a smart card with a supply path which is not implemented using a DC-to-DC voltage converter and the supply current for a smart card with a supply path which is implemented using a DC-to-DC voltage converter.

FIG. 6 shows a comparison of the supply current $I_{lv}$ for a smart card with a supply path which is not implemented using a DC-to-DC voltage converter, as described (illustrated in a first graph 601), and the supply current $I_{lv}$ for a smart card with a supply path which is implemented using a DC-to-DC voltage converter, as described (illustrated in a second graph 602).

The graphs 601, 602 each show the dependence of the supply current $I_{lv}$ (which increases from the bottom to the top along a current axis 604) depending on the field strength at the antenna (which increases from left to right along a field strength axis 603).

The results are based on a simulation with a radiofrequency of 13.56 MHz and a maximum antenna voltage of 11 V.

The ratio of the currents (implementation using DC-to-DC voltage converter in comparison with implementation without DC-to-DC voltage converter) is equal to 17.30 mA/7.25 mA=2.38 at a field strength of 1.5 A/m, which can be considered to be a considerable improvement in terms of the supply to the smart card.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A smart card, comprising:
an antenna, which is configured to receive an electromagnetic signal;
a rectifier which is configured to rectify the received signal;
a capacitive or an inductive DC-to-DC voltage converter, which is configured to provide a supply voltage on the basis of the rectified signal and such that a ratio of a power at an output of the rectifier to a power at an output of the DC-to-DC voltage converter is close to unity;
wherein the DC-to-DC converter comprises a diode connected with its anode to the output of the rectifier and a switch connected in parallel with the diode.

2. The smart card of claim 1,
wherein the DC-to-DC voltage converter is configured to provide the supply voltage for a component to be supplied.

3. The smart card of claim 1,
wherein the DC-to-DC voltage converter is configured to provide the supply voltage for an integrated circuit.

4. The smart card of claim 1,
wherein the DC-to-DC voltage converter is a switched inductive DC-to-DC voltage converter or a switched capacitive DC-to-DC voltage converter.

5. The smart card of claim 1, further comprising:
a stabilization circuit which is configured to limit the supply voltage to predetermined value.

6. The smart card of claim 5,
wherein the stabilization circuit has a Zener diode.

7. The smart card of claim 1,
wherein the rectified signal is a pulse signal.

8. The smart card of claim 1, further comprising:
a regulating circuit, which is configured to regulate the maximum antenna voltage.

9. The smart card of claim 8,
wherein the regulating circuit is configured to regulate the maximum antenna voltage by setting the input resistance of the rectifier.

10. The smart card of claim 8,
wherein the rectified signal is a pulse signal, and wherein the regulating circuit is configured to set the input resistance by setting the pulse width of the pulse signal.

11. The smart card of claim 8,
wherein the regulating circuit is configured to regulate the maximum antenna voltage to a predetermined reference voltage.

* * * * *